United States Patent Office.

HENRY W. JOHNS, OF NEW YORK, N. Y.

Letters Patent No. 102,824, dated May 10, 1870.

IMPROVED ACID AND WATER-PROOF COMPOSITION FOR COATING CLOTH, &c.

The Schedule referred to in these Letters Patent and making part of the same.

*To all whom it may concern:*

Be it known that I, HENRY W. JOHNS, of the city of New York, in the county and State of New York, have invented a new and improved Acid and Water-proof Composition; and I do hereby declare that the following is a full, clear, and exact description thereof, which will enable others skilled in the art to make and use the same.

My invention has for its object to furnish an improved composition for coating and saturating canvas and other woven or felted fabrics, for roofing and sheathing purposes, for lining boxes and barrels, &c., and for other uses, such as forming bags for guano, phosphates, and other fertilizers, and forming tarpaulins, sails, cordage, seines, &c.; for coating the interior of boxes, barrels, and other articles liable to injury from acids, mold, or decomposition; of vegetable and animal matter, and as a body for roof-coatings, cements, and preservative and marine paints, &c.; and It consists in the admixture and combination of paraffine-wax, paraffine-oil, and carbolic acid—or "dead-oil," which contains this acid—with each other, and with a suitable quantity of asphaltum or other similar substance or substances, and reduced to proper consistency to make its application easy, for the various purposes desired.

When a light-colored or transparent coating is desired, instead of asphaltum I use a gum or gelatine composed of gums copal, shellac, and boiled linseed-oil.

The presence of paraffine-wax in this composition renders it perfectly acid-proof for all practical purposes; and, when the paraffine-wax is combined with the ingredients herein described, the composition forms a better preservative of fabrics, and a more perfect repellant of water than any other material heretofore used for the purposes above enumerated, and, when applied to bags for containing fertilizers and other similar substances, effectually prevents the escape of ammonia therefrom.

The carbolic acid is used for its antiseptic qualities, and for the better protection of articles treated with the composition, from destruction or injury by insects, &c.

These ingredients may be used in various proportions, or combined with others of similar nature, to form a composition of the same general character, viz, protecting the materials or articles coated with it from decay or injury from any or all of the above-enumerated causes.

When preparing this composition for general purposes, I take two pounds of paraffine-wax, one pound, or about a pint, of paraffine-oil, one-quarter of a pound of carbolic acid, or about a half pint of "dead-oil," and eight pounds of asphaltum, and mix them together.

This mixture may be applied, when warm, as a coating, to one or both sides of canvas, felt, &c., for roofing purposes, and may be reduced with naphtha, benzine, or spirits of turpentine, to be applied as a coating in the form of a paint to canvas, felt, tin, and other materials.

When used for coating canvas for bags, tarpaulins, &c., and it is desired to have one side of the canvas perfectly clean, the said canvas should be first dampened with water, to prevent the composition from penetrating the fibers.

The composition is then applied in a plastic state, when warm, as a coating to one side of the fabric.

When in this plastic state, the composition may be applied to both sides of the fabric, and pressed through the interstices of the canvas or cloth, without saturating or penetrating the fibers of said cloth.

When the composition is to be applied to canvas or cotton duck for sails, &c., a lighter-colored or transparent mixture may be made by varying the ingredients as follows:

Two pounds of paraffine-wax, one-half a pound, or about a half pint, of paraffine-oil, one-half a pound of carbolic acid, or about a pint of dead-oil, and five pounds of a gum or gelatine, composed of gum-copal, gum-shellac, and linseed-oil.

This composition may be reduced to the desired consistency by the addition of spirits of turpentine, benzine, or naphtha.

The whole should be mixed together while warm.

It is well known that tar, pitch, gums, linseed-oil, and other similar substances, applied, in the manner heretofore practiced, to cotton canvas and other woven or felted fabrics, cause said fabrics to rot. My improved composition, on the contrary, acts as a preservative to said fabrics under all ordinary circumstances, which preservative quality is owing to the presence of paraffine-wax, paraffine-oil, and carbolic acid.

It should be observed that a coating of powdered asbestos or soap-stone may be applied to the coated canvas, to prevent it from adhering.

Having thus described my invention,

I claim as new and desire to secure by Letters Patent—

An improved acid and water-proof composition, formed by the admixture of paraffine-wax, paraffine-oil, and carbolic acid, with each other, and with asphaltum or other suitable adhesive material or materials, substantially as and for the purposes herein described and set forth.

The above specification of my invention signed by me this 6th day of April, 1870.

HENRY W. JOHNS.

Witnesses:
GEO. W. MABEE,
JAMES T. GRAHAM.